(No Model.)
G. H. GEROW.
DUST PAN.
No. 561,219.  Patented June 2, 1896.
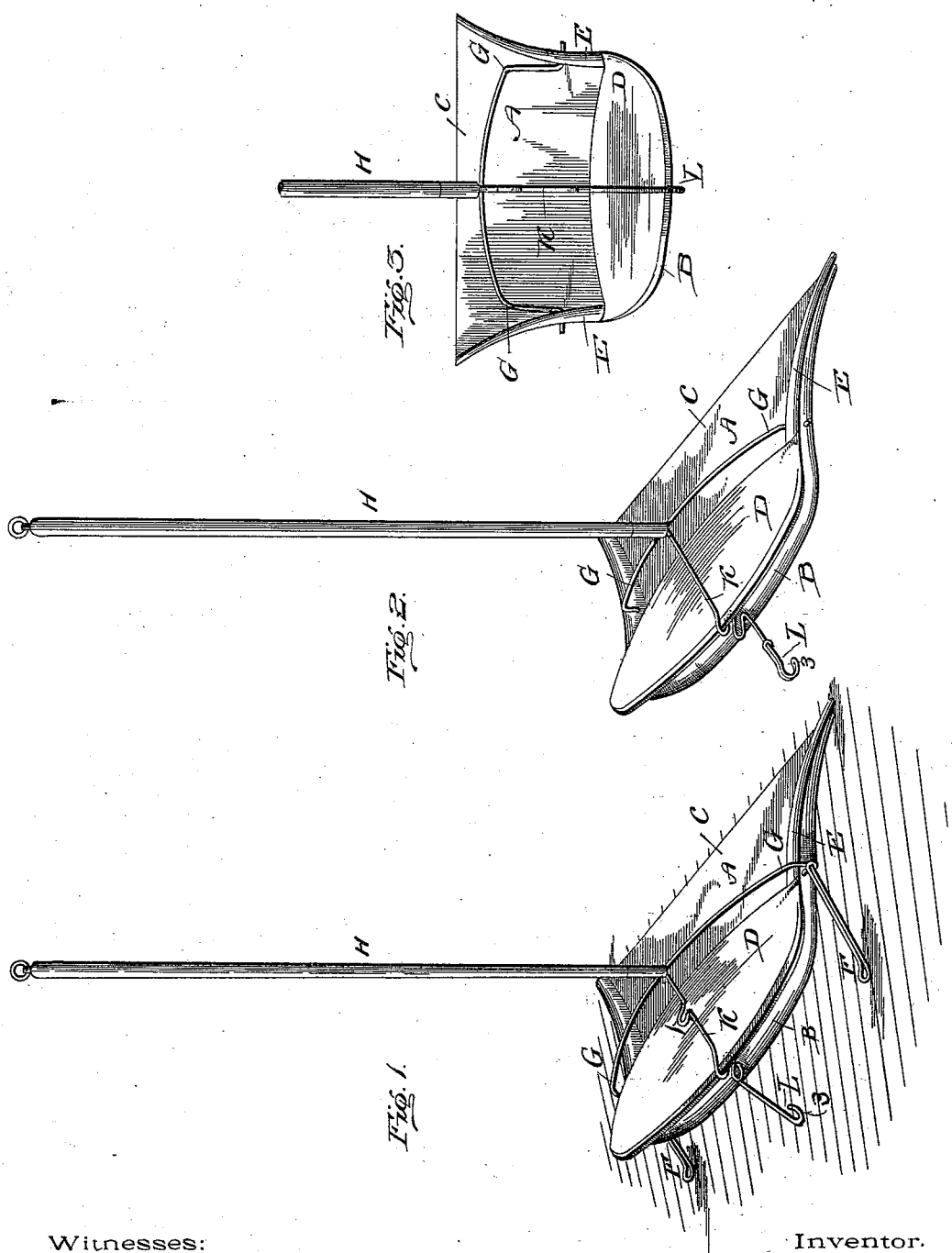
Witnesses:
Wm C. Dashiell
G. N. Woodbury
Inventor.
George H. Gerow
By
Stephenson & Woodbury
Attorneys

UNITED STATES PATENT OFFICE.

GEORGE H. GEROW, OF PORT HURON, MICHIGAN, ASSIGNOR, BY MESNE ASSIGNMENTS, TO WALTER J. HOPKINS, OF ST. CLAIR, MICHIGAN.

DUST-PAN.

SPECIFICATION forming part of Letters Patent No. 561,219, dated June 2, 1896.

Application filed December 8, 1894. Serial No. 531,211. (No model.)

*To all whom it may concern:*

Be it known that I, GEORGE H. GEROW, a citizen of the United States, residing at Port Huron, in the county of St. Clair and State of Michigan, have invented certain new and useful Improvements in Dust-Pans; and I do hereby declare the following to be a full, clear, and exact description of the invention, such as will enable others skilled in the art to which it appertains to make and use the same.

This invention consists in providing a dust-pan with a handle adapted for use without stooping too far, and with the other features substantially as set forth hereinafter, and as illustrated in the accompanying drawings, in which—

Figure 1 illustrates the parts in position for use. Fig. 2 is a modification of Fig. 1. Fig. 3 shows the same in position for carrying or storage.

The pan is of the form shown or of any suitable form.

The pan A, as shown, has a bottom B with a broad front edge C to fit onto the floor to receive the sweepings, and has raised side edges E and a raised back edge with a cover D, forming a pocket for carrying the dust. It has a handle H with three wire branches. Two of these branches G extend to the two sides and connect bail-like with holes in the edges E in front of cover D.

As shown in Fig. 1, the branches G extend over the edges E and bend back and down and then double and return, forming the legs F to support the back of the pan and hold its front edge C down at an angle on the floor to receive dust swept in. The wire then being twisted together has its end bent inward hook-like through holes in the edge E to make the connection with the pan.

The third branch K is bent back with a hook-like projection to catch on the rear edge of the pan to hold it firmly in position in use, as in Fig. 1.

The branches G may be made to bend into the holes in the edges of the pan outward instead of bending over them and hooking inward, and the back legs F may be omitted and instead of legs F one leg L may be extended back from branch K for the purpose.

When the pan is to be used, the hook on branch K is sprung onto the rear edge of the pan so as to hold it firmly for use, as in Fig. 1. When the dust is to be carried or the pan hung up when not in use, this hook on branch K is sprung off the edge of the pan and the handle turned forward, as in Fig. 3. The leg L also has a hook 3 at one end, which may be sprung over the edge of the pan to hold it in this position, as indicated in Fig. 3. This leg may be used with legs F, if desired, to back the pan in its second position. The branch K has another hook $l$ bent into it, which may be sprung over the back of the pan when the handle is turned back to hold it in still another position. Other modifications could be made, if desired.

I claim—

1. In a dust-pan, the combination of a pan, a handle hinged to the sides of the pan by stiff branches of the handle, and a stiff rearward branch of the handle arranged to form a supporting-leg and having a notch arranged to engage with the rear edge of the pan and hold it in a braced relation to the pan, substantially as set forth.

2. In a dust-pan, a hanger-bail provided at its sides with the pendent feet, combined with a pan pivotally hung within the hanger-bail, and a notched locking device attached to said hanger-bail and provided with a foot which extends downwardly from the pan and is adapted to rest on the floor, substantially as described.

3. The combination with a hanger, and a dust-pan pivoted therein, of a yieldable locking device to engage with the rear edge of the pan and provided with a rearwardly and downwardly extending foot, substantially as described.

In testimony whereof I affix my signature in presence of two witnesses.

GEORGE H. GEROW.

Witnesses:
 JOHN M. GLEASON,
 ED. W. KESSEL.